(12) United States Patent
Kamio et al.

(10) Patent No.: US 7,609,974 B2
(45) Date of Patent: Oct. 27, 2009

(54) DATA TRANSMISSION METHOD AND A SYSTEM THEREOF

(75) Inventors: Yukiyoshi Kamio, Tokyo (JP); Tetsuya Miyazaki, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 622 days.

(21) Appl. No.: 11/481,756

(22) Filed: Jul. 5, 2006

(65) Prior Publication Data
US 2007/0009264 A1     Jan. 11, 2007

(30) Foreign Application Priority Data
Jul. 6, 2005    (JP)    ............... 2005-196953

(51) Int. Cl.
*H04B 10/00* (2006.01)
(52) U.S. Cl. .............. 398/161; 398/32; 398/53
(58) Field of Classification Search .......... 398/32, 398/53, 102, 150, 154, 155, 161
See application file for complete search history.

(56) References Cited

U.S. PATENT DOCUMENTS 4,899,367 A * 2/1990 Sampei ............... 375/264
6,356,555 B1 * 3/2002 Rakib et al. ............... 370/441
2003/0156603 A1 * 8/2003 Rakib et al. ............... 370/485
2004/0213566 A1 * 10/2004 Takanashi et al. ............... 398/32

FOREIGN PATENT DOCUMENTS

WO    WO 03/000008 A2    1/2003

OTHER PUBLICATIONS

K. Kikuchi, et al., "Degradation of Bit-Error Rate in Coherent Optical Communications Due to Spectral Spread of the Transmitter and the Local Oscillator," IEEE/USA Journal of Lightwave Technology, vol. LT-2, No. 6, pp. 1024-1033, Dec. 1984.
R. A. Griffin, et al., "10 Gb/s Optical Differential Quadrature Phase Shift Key (DQPSK) Transmission using GaAs/AlGaAs Integration," Proc of OFC 2002 Postdeadline Papers, FD6-1 to FD6-3, Mar. 2002.

(Continued)

*Primary Examiner*—Dzung D Tran
(74) *Attorney, Agent, or Firm*—Christie, Parker & Hale, LLP

(57) ABSTRACT

An optical transmitter generates a transmission signal having a frame as a unit, the frame including a signal pilot signal with fixed amplitude and phase and two data bits to output the generated signal into a transmission line. In a receiver, a splitter splits the signal light from the transmission line. An optical delay delays the signal light for a 1-bit period. A first combiner combines the signal light from the transmission line and the output signal light from the optical delay. A photodetector converts the combined light into an electrical signal. A 3-bit optical delay, a second combiner, a BPF, and an oscillator generate a frame-timing signal. A gate separates a data from the output from the photodetector under the control of a gate control unit. A binary discriminator binary-discriminates the output signal from the gate.

24 Claims, 7 Drawing Sheets

OTHER PUBLICATIONS

B. Wandernoth, "1064 nm, 565 Mbit/s PSK Transmission Experiment with Homodyne Receiver Using Synchronisation Bits," Electronics Letters, vol. 27 No. 19, pp. 1692-1693, Sep. 12, 1991.

S. Tsukamoto, et al., "Coherent Demodulation of 40-Gbit/s Polarization-Multiplexed QPSK Signals with 16-GHz Spacing after 200-km Transmission," Proc of OFC 2005, PDP29, Mar. 2005.

T. Miyazaki, "PSK Self-Homodyne Detection Using a Pilot Carrier for Multibit/Symbol Transmission With Inverse-RZ Signal," IEEE Photonics Technology Letters, vol. 17, No. 6, pp. 1334-1336, Jun. 2005.

European Search Report dated Oct. 4, 2006, for EP 06114129.7, in the name of National Institute of Information and Communications Technology Incorporated Administrative Agency, 6 pages.

* cited by examiner

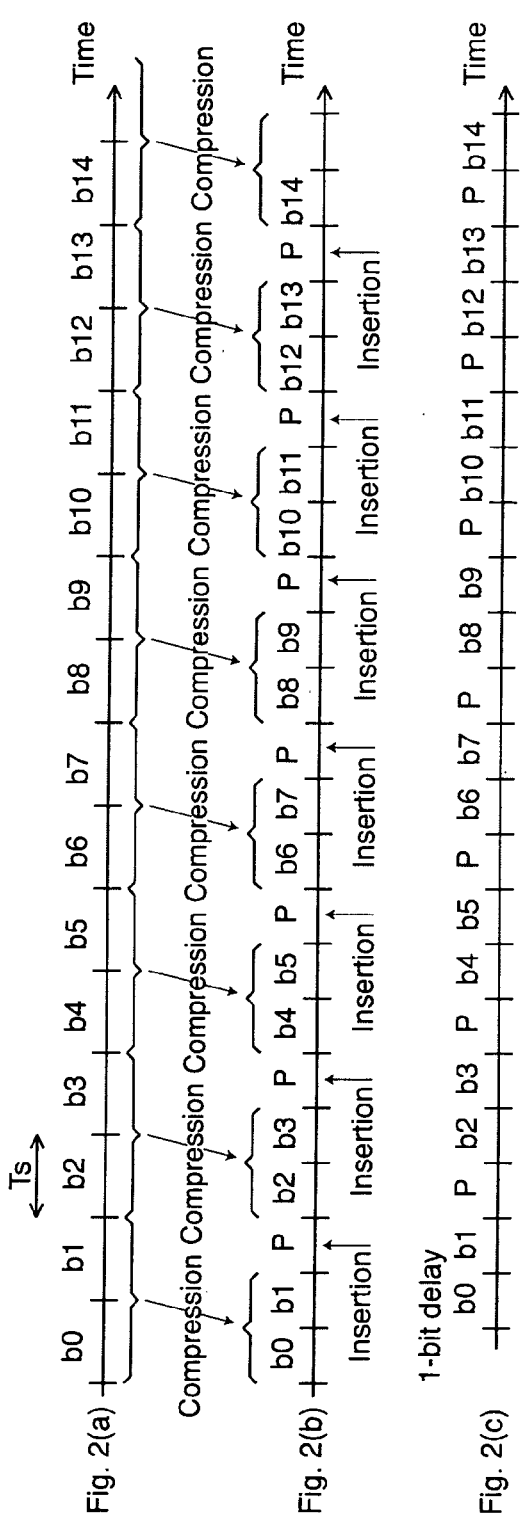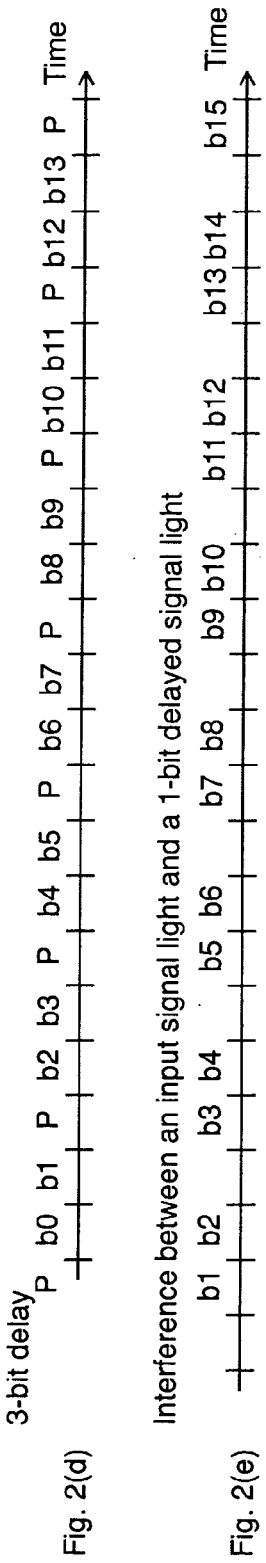

DATA TRANSMISSION METHOD AND A SYSTEM THEREOF

CROSS REFERENCE TO RELATED APPLICATIONS

This application claims priority to Japanese Patent Application No. 2005-196953, filed on Jul. 6, 2005, the entire contents of which are incorporated herein by reference.

FIELD OF THE INVENTION

This invention relates to a data transmission method and its system.

BACKGROUND OF THE INVENTION

In high-speed optical transmission, a number of detecting systems are known according to the modulation systems.

A heterodyne detecting system based on a reference carrier is described in "Degradation of Bit-Error Rate in Coherent Optical Communications Due to Spectral Spread of the Transmitter and the Local Oscillator," IEEE/USA J. Lightwave Technol., Vol. LT-2, pp. 1024-1033, December 1984, by K. Kikuchi, T. Okoshi, M. Nagamatsu, and N. Henmi. This system, similar to the present wireless communication, regenerates a carrier from a received signal to stabilize its frequency using an optical PLL (phase locked loop). This system does not require differential encoding process and it is possible to realize a transmission capacity and a receiving sensitivity level near to the theoretical limits. However, it is necessary to control a polarization of the reference carrier or received signal such that they are parallel each other. In addition, it is difficult to realize an optical PLL. Moreover, it is required to suppress the influence of a phase noise of the reference carrier.

A delayed detection system for a DQPSK (Differential Quadrature Phase Shift Keying) signal is described in "10 Gb/s Optical Differential Quadrature Phase Shift Key (DQPSK) transmission Using GaAs/AlGaAs Integration," Proc of OFC2002, FD6, March 2002 by R. A. Griffin, R. I. Johnston, R. G. Walker, J. Hall, S. D. Wadsworth, K. Berry, A. C. Carter, M. J. Wale, J. Hughes, P. A. Jerram, and N. J. Parsons. The DQPSK transmission is a system to carry information using phase differentials between bits. A DQPSK signal is easily converted into an ASK (Amplitude Shift Keying) signal using interference between bits and then a data is demodulated from the ASK signal by an existing demodulator. This delayed detection system detects a signal by regarding one-bit-prior signal as a local oscillating light. Since there is no need to regenerate a carrier, this system is practical and easy to be realized. However, in multi-level modulation, a transmitting side is required to operate complicated preceding. Also, it is not easy to comply with a change of a modulation method.

Another system is also well known in which a carrier signal is superimposed in a band of a modulated signal as a pilot carrier and a regenerated carrier is extracted through a filter. In this system, a carrier is separated and extracted by a filter and therefore a complicated filter control system is required to realize a stable receiving performance.

In a wireless communication system, a system to perform quasi-synchronous detection using a pilot symbol is well known as a kind of fading compensation system (see U.S. Pat. No. 4,899,367). In this system, a local reference signal generator in a receiving station performs temporary detection and then the result is compensated by a pilot symbol. When this system is applied to optical transmission, it is necessary to make polarizations of a reference carrier and a received signal parallel with each other.

There is a transmission system to perform self-heterodyne detection by transmitting a pilot carrier in a frequency band other than the frequency band for data transmission. However, the pilot carrier needs to be sufficiently apart from the frequency band for data transmission and therefore the usability of the frequencies becomes inefficient.

A system to use a pilot signal and a regenerated clock signal is described by B. Wandernoth in "1064 nm, 565 Mbit/s PSK TRANSMISSION EXPERIMENT WITH HOMODYNE RECEIVER USING SNNCHRONISATION BITS," ELECTRONICS LETTERS. Vol. 27, No. 19, September 1991. However, this system has a problem that transmission speed in an electric circuit is limited.

A synchronous detection system is described by Satoshi Tsukamoto, Dany-Sebastien Ly-Gagnon, Kazuhiro Katoh, and Kazuro Kikuchi in "Coherent Demodulation of 40-Gbit/s Polarization-Multiplexed QPSK Signals with 16-GHz Spacing after 200-km Transmission," Proc. Of OFC2005, PDP29, March 2005. This system AD-converts a received data at a high speed and digital-signal-processes the converted digital data to correct distortion of phase fluctuations. However, this system is not suitable for high-speed transmission since the performance of the AD-conversion and digital signal processing is limited.

SUMMARY OF THE INVENTION

Asynchronous detecting system brings a highly sensitive receiving level. When a synchronous detecting system is realized in high-rate digital transmission, e.g. high-speed optical digital transmission, it is possible to obtain a much faster data rate.

In a data transmission method according to an exemplary embodiment of the invention, a transmission signal having a frame as a unit is generated, the frame including a single pilot signal with fixed amplitude and phase and two or more predetermined number of data signals. The transmission signal is output into a transmission line. According to the pilot signal included in at least one of the transmission signal input from the transmission line and the signal in which the transmission signal is delayed for a predetermined period, the data signal is separated from the other signal not including the pilot signal. A frame-timing signal is generated from the transmission signal input from the transmission line. A desired data signal is extracted from the separated data signal according to the frame-timing signal.

A data transmission system according to an exemplary embodiment of the invention includes a transmitter to generate a transmission signal having a frame as a unit, the frame including a single pilot signal with fixed amplitude and phase and two or more predetermined number of data signals, to output the transmission signal into a transmission line and a receiver to receive a desired data signal from the transmission signal input from the transmission line. Characteristically, the receiver includes a delay to delay the transmission signal input from the transmission line for a predetermined period, a data separator to separate a data signal in a predetermined time slot in the frame from the transmission signal input from the transmission line, a frame-timing generator to generate a frame-timing signal from the transmission signal input from the transmission line, and a gate to extract a desired data signal from the data signal separated by the data separator according to the frame-timing signal.

According to the exemplary embodiment of the invention, a synchronous detecting system can be realized without using a highly accurate light source that is expensive and complicated to control.

BRIEF DESCRIPTION OF THE DRAWINGS

The above and other objects, features and advantages of the present invention will be apparent from the following detailed description of exemplary embodiments of the invention in conjunction with the accompanying drawings, in which:

FIG. 2, including FIG. 2(a), FIG. 2(b), FIG. 2(c), FIG. 2(d), FIG. 2(e), and FIG. 2(f), shows a timing chart of the first embodiment;

FIG. 4(a), FIG. 4(b), FIG. 4(c), FIG. 4(d), FIG. 4(e), FIG. 4(f), FIG. 4(g), FIG. 4(h), and FIG. 4(i), shows a timing chart of the third embodiment;

DETAILED DESCRIPTION

Explanatory embodiments of the invention are explained below in detail with reference to the drawings.

Figure 1:
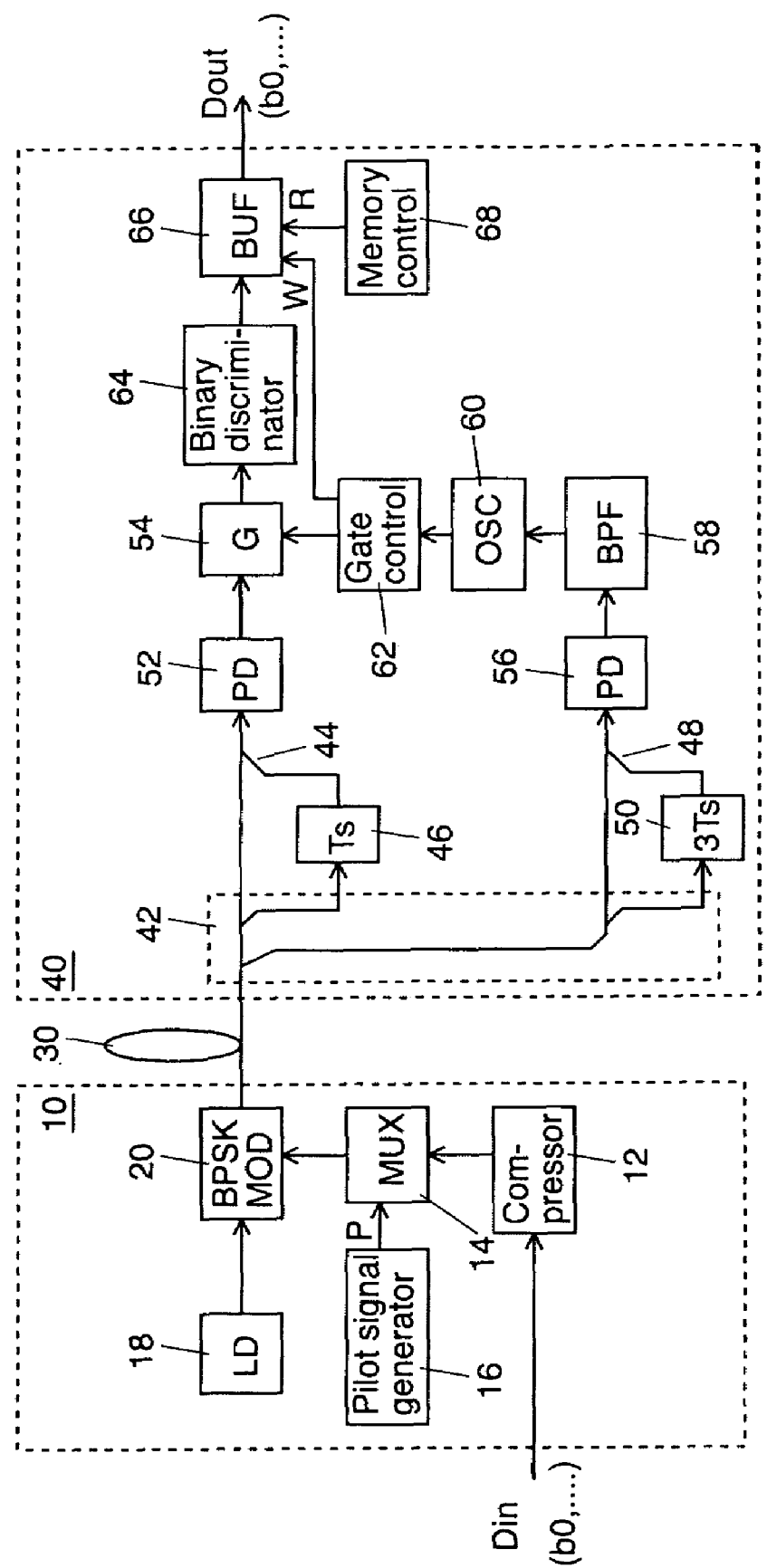
FIG. 1 shows a schematic block diagram of a first exemplary embodiment according to the invention.

FIG. 1 shows a schematic block diagram according to a first exemplary embodiment of the invention adapted to an optical transmission system using BPSK (Binary Phase Shift Keying) modulation, and FIG. 2 shows a timing chart of the first embodiment. In the optical stage of this embodiment, a binary digit 0 is expressed as an optical phase 0, a binary digit 1 is expressed as an optical phase $\pi$, and a pilot signal being inserted into a signal light or time-division-multiplexed with the signal light is expressed as an optical phase 0.

A data Din at a bit rate B including a bit string of b0 to b14 as shown in FIG. 2(a) enters an optical transmitter 10. In this embodiment, a pilot signal P is inserted every two bits of the input data Din. For this procedure, a compressor 12 compresses the input data into two third in the time domain. A multiplexer 14 buffers the data compressed by the compressor 12 in the time domain and multiplexes every two bits of the compressed data with one pilot signal P generated by a pilot signal generator 16 to output a signal at a bit rate 3B/2. The output from the multiplexer 14 is shown in FIG. 2(b). In other words, in this embodiment, one pilot signal and two bits of signals are included in one frame of three bit intervals. The bit length of one frame can be flexibly selected. For explanatory convenience, a pilot signal is located in the head of a frame.

In this embodiment, the pilot signal has a binary digit of 0. To realize a simpler configuration, it is possible that the compressor 12 itself is an apparatus to compress an input data into two third in the time domain and to insert a binary digit 0 into an empty timeslot. Here, to make the basic of this embodiment easily understandable, the multiplexer 14 and the pilot signal generator 16 are specially shown in figure.

A laser diode 18 outputs a coherent pulse laser light having a repetition rate of 3B/2 (Hz). A BPSK modulator 20 modulates optical phase of the laser light output from the laser diode 18 according to the output bit train from the multiplexer 14. That is, the BPSK modulator 20 outputs a signal light of optical phase 0 when the output bit value of the multiplexer 14 is 0 and outputs a signal light of optical phase $\pi$ when the output bit value of the multiplexer 14 is 1. In phase modulation, continuous laser light is also applicable instead of the pulse laser light.

The signal light output from the BPSK modulator 20 carries the input data b0, . . . and the pilot signal P. The signal light output from the BPSK modulator 20 enters an optical transmission line 30 as an output signal light from the optical transmitter 10. The signal light propagated in the optical transmission line 30 enters an optical receiver 40.

In the optical receiver 40, the signal light from the optical transmission line 30 enters an optical splitter 42 first. The optical splitter 42 splits the signal light from the optical transmission line 30 into four split signal lights, each having equal optical power.

A first split signal light from the optical splitter 42 enters an optical coupler 44 for optical interference and a second split signal light enters the optical coupler 44 through an optical delay 46 to delay the signal light by Ts which corresponds to one timeslot in the frame. That is, the optical coupler 44 couples the input signal light from the optical transmission line 30 with the signal light delayed by one timeslot of Ts. The optical intensity of the first split signal light is equal to that of the second split signal light. As is generally known, this optical circuit is a delay interferometer in which an optical delay is disposed on one of two arms of a Mach-Zehnder interferometer.

FIG. 2(c) shows the bit disposition of an output signal light from the optical delay 46. The optical coupler 44 optically couples the signal light having the bit value shown in FIG. 2(b) with the signal light having the bit value shown in FIG. 2(c) to separate a bit from one input light using the optical interference, the bit being included in the same timeslot in which the other input light has a pilot signal P. FIG. 2(e) shows the bit disposition of the output signal light from the optical coupler 44. In timeslots in which neither input light has a pilot signal P, signal values are unknown or indeterminate and therefore shown as blank spaces in FIG. 2(e).

In this embodiment, in the optical stage, the optical phase of the pilot signal P is 0 and the optical phase of each bit of b0, . . . of the input data Din is 0 or $\pi$. The coupling result of a bit signal having the optical phase 0 and a pilot signal P generates a signal with non-zero optical intensity while the coupling result of a bit signal having the optical phase $\pi$ and a pilot signal P generates a signal having zero optical intensity due to the interference. That is, in this embodiment, the output of the optical coupler 44 becomes negative logic. To solve such logical inversion, a logical inverter should be disposed at an appropriate spot in the rear stage. As is generally known, there is an optical coupler to generate an optical signal with non-zero intensity when the optical phases of input lights are 0 and $\pi$ and to generate a signal with zero intensity when the optical phases of both input lights are 0. This type of optical coupler is also applicable to solve the logical inversion.

A third split signal light from the optical splitter 42 enters an optical coupler 48 for optical interference while a fourth split signal light enters the optical coupler 48 through an optical delay 50 to delay the signal light by 3Ts which corresponds to 3 timeslots. That is, the optical coupler 48 couples the input signal light from the optical transmission line 30 with the signal light delayed by three bits. The optical intensity of the third split signal light equals to that of the fourth split signal light. As is well known, this optical circuit is also a delay interferometer in which an optical delay is disposed on one of two arms of a Mach-Zehnder interferometer.

FIG. 2(d) shows an output signal from the optical delay 50. The optical coupler 48 optically couples a signal light having the bit value shown in FIG. 2(b) with a signal light shown in FIG. 2(d). FIG. 2(f) shows the bit disposition of an output signal from the optical coupler 48. In the output from the optical coupler 48, similar to that of the optical coupler 44, a bit is separated from one input light, the bit being included in the same timeslot in which the other input light has a pilot signal P. Since pilot signals in both input lights are included in the same timeslots, the pilot signals are separated. In timeslots in which neither input light has a pilot signal P, signal values are unknown or indeterminate and therefore shown as blank spaces in FIG. 2(f).

As understandable from FIGS. 2(b) and 2(d), each input optical signal of the optical coupler 48 includes a pilot signal P in the same timing due to the 3-bit delay by the optical delay 50. Therefore, the output optical signal from the optical coupler 48 always has the optical intensity of non-zero in the timeslot including a pilot signal P as shown in FIG. 2(f). The optical intensity of the other bit positions depends on the bit values b0, . . . of the input data Din.

From the different viewpoint, the circuit configuration including the 1-bit optical delay 46 and the optical coupler 44 is an apparatus to separate or gate a bit being located immediately after a pilot signal and a bit being located immediately before the pilot signal from a bit train transmitted from the optical transmitter 10. Therefore, as shown in FIG. 2(e), the circuit configuration composed of the 1-bit optical delay 46 and the optical coupler 44 can separate all the bits in the input data Din although bits of indeterminate value are also included. In this embodiment, a gate 54 removes the bits of indeterminate value and a buffer 66 removes the bits in which the pilot signals are located.

In addition, the 3-bit optical delay 50 and the optical coupler 48 are a apparatus to separate or gate a bit being delayed from a pilot signal by 3-bit, namely 3Ts, and a bit preceding the pilot signal by 3-bit, namely 3Ts (those bits are both pilot signals). The 3-bit optical delay 50 and the optical coupler 48 can separate the pilot signals although bits of indeterminate value are also included. The head of the frame can be detected from the separated pilot signal and thus respective bit positions of the input data Din can be determined.

A photodetector 52 converts the output optical signal from the optical coupler 44 into an electrical signal. The output signal from the photodetector 52 enters the gate 54. A photodetector 56 converts the optical signal output from the optical coupler 48 into an electrical signal. The output signal from the photodetector 56 enters a control terminal of a local oscillator 60 through a filter 58 to extract a frequency component of the pilot signal. The circuit including the optical coupler 48, the optical delay 50, the photodetector 52, and the filter 58 functions as an apparatus to separate a pilot signal or a frequency component of the pilot signal from a signal light input from the optical transmission line 30. The start timing of each frame can be known according to the output from the filter 58.

The local oscillator 60 oscillates at the oscillating frequency corresponding to the bit rate (3B/2) of the output signal from the multiplexer 14 to apply a clock having the oscillating frequency to a gate controller 62. The phase of the output clock from the local oscillator 60 is controlled so as to synchronize with the output from the filter 58. Therefore, the output clock from the local oscillator 60 also functions as a frame-timing signal to determine the frame timing.

The local oscillator 60 also can have a circuit configuration to regenerate the clock from the input light from the optical transmission line 30 and to control the phase of the clock with the output from the filter 58.

A gate controller 62 controls the transmission through the gate 54 according to the clock from the local oscillator 60. The bit number and the location of a pilot signal in one frame are known. The gate controller 62 can accurately determine a data-bit part and a pilot signal part in an input optical signal from the optical transmission line 30 based on the information of the frame configuration and the clock from the local oscillator 60, the clock being synchronized with a pilot signal. According to the determination, the gate controller 62 controls the gate 54 so as to eliminate a signal value of the timeslot in which a pilot signal is inserted from the output signal (FIG. 2(e)) from the photodetector 52, that is, to transmit all timeslots but the timeslot in which a pilot signal is inserted. With this operation, the gate 54 can fix the value of the timeslot in which a pilot signal is inserted to a binary digit 0, which value was indefinite in the output (FIG. 2(e)) from the photodetector 52.

A binary discriminator 64 discriminates the output signal from the gate 54 into a binary digit using a predetermined threshold and applies the discriminated result to a buffer memory 66. According to the gate control signal output from the gate controller 62, the buffer memory 66 stores all timeslots but the timeslot in which a pilot signal is inserted from the output data from the binary discriminator 64. A memory controller 68 reads out each bit value being stored by the buffer memory 66 at a bit rate B in order. With the above operation, the optical receiver 40 can output the data of b0, . . . transmitted from the optical transmitter as an output data Dout.

It is also applicable that a clock having a frequency 3B/2 is regenerated from one of the outputs from the optical splitter 42 and the phase of the clock is controlled by an output from the photodetector 56 or the filter 58. According to the regenerated clock with the controlled phase, the gate controller 62 controls the transmission of the gate 54 and the writing of the buffer memory 66.

The photodetectors 52 and 56 can include either a configuration with a single photodetector or a balanced receiving configuration with two photodetectors. The latter configuration is more resistant to noise compared to the former. When the balanced receiving system is used, the optical coupler 44 should be changed to a type having an output port to couple two input optical signals in the same phase as well as an output port to couple two input optical signals in the opposite phase.

This embodiment is also applicable to amplitude modulation. For instance, by providing the maximum amplitude value to a pilot signal, a signal located in the same timeslot with the pilot signal can be separated by a delay separator.

In this embodiment, although a pilot signal and a data signal are multiplexed and then converted into an optical signal, it is applicable that the pilot signal and the data signal are converted into optical signals first and then time-division-multiplexed; namely, an OTDM (Optical Time Division Multiplexing) method is also applicable to this embodiment.

In the embodiment shown in FIG. 1, since one frame is set to have 3 bits and 2 bits of data are inserted to one frame, all bits can be received with a single bit separator system composed of the 1-bit optical delay 52 and the optical coupler 44. When one frame is set to have n (n≧3) bits or more, generally (n−1) bit separator systems are required. However, when the function capable of separating 2 bits using a single bit separator system is utilized, at least (n−1)/2 bit separator systems are required when n is an odd number while n/2 bit separator systems are required when n is an even number. In both cases, a configuration including an apparatus to separate a pilot signal is necessary to detect the head of a frame.

Figure 3:
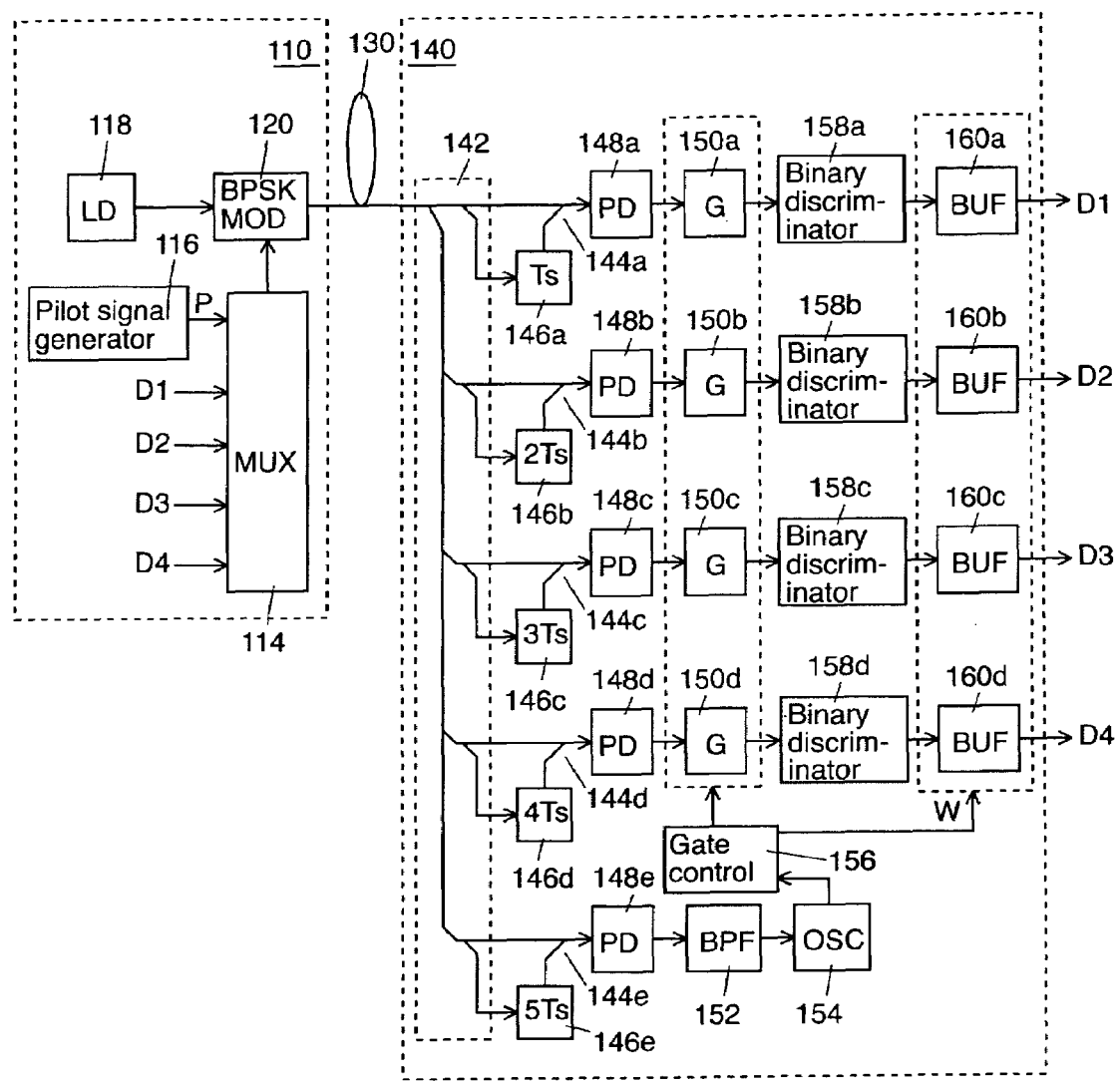
FIG. 3 shows a schematic block diagram of a third exemplary embodiment according to the invention.
Figure 4:
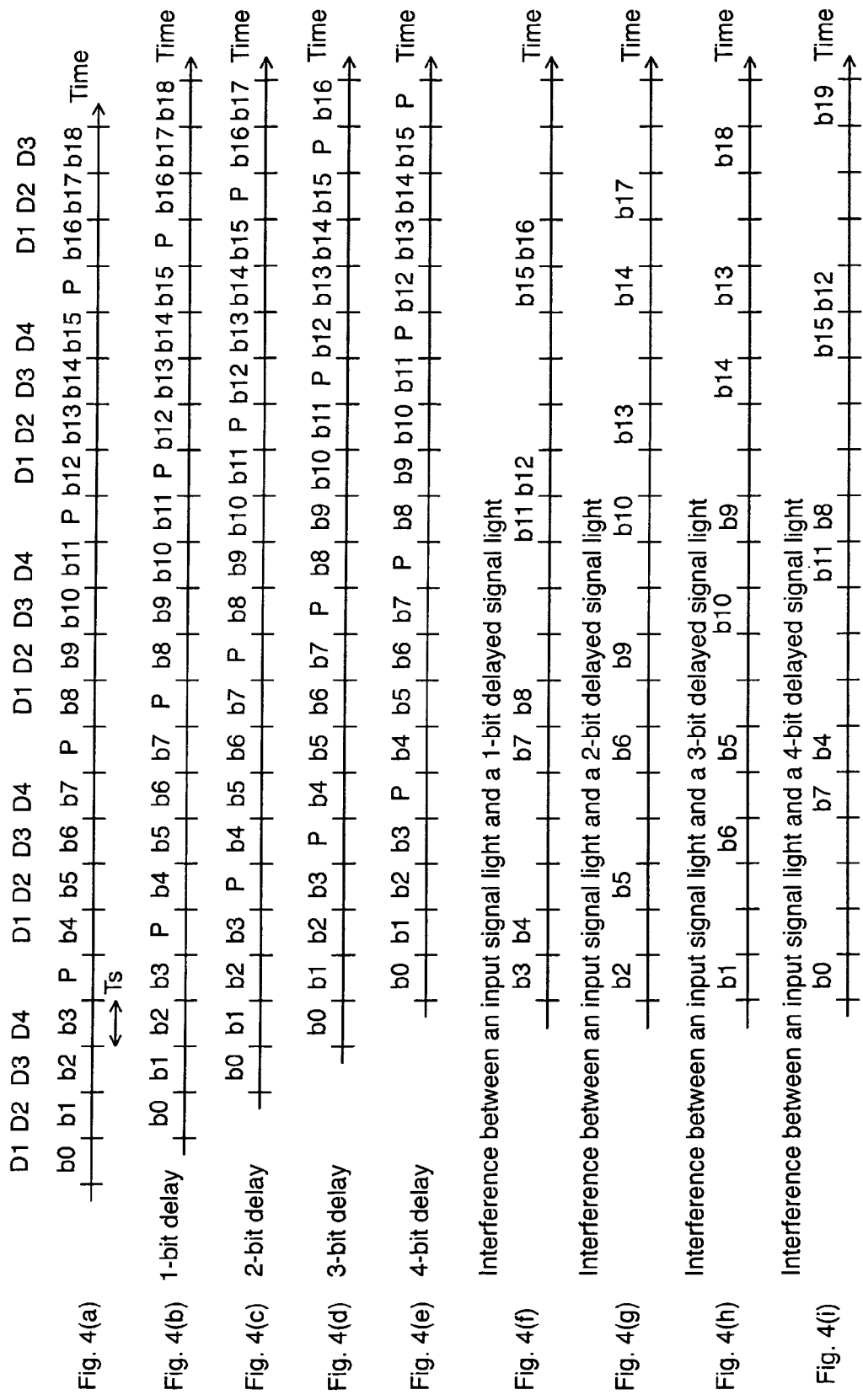
FIG. 4, including

An exemplary embodiment applied to an optical transmission system to transmit four channels through time-division-multiplexing is explained next. FIG. 3 shows a schematic block diagram of the embodiment and FIG. 4 shows its timing chart. One frame has 5 bits including a pilot signal. As is explained in the first embodiment, a bit separator, which includes an optical delay to delay by a predetermined bit number and an optical coupler, can separate corresponding 2 bits. However, to make the separating procedure of each bit easily understandable, FIG. 3 shows a configuration including 4 separators to separate 4 bits in one frame respectively and another separator to separate a pilot signal in the frame. In this embodiment, similar to the first embodiment, a binary value 0 is expressed as an optical phase 0, a binary value 1 is expressed as an optical phase $\pi$, and a pilot signal to be inserted in a signal light or time-division-multiplexed with the signal light is expressed as an optical phase 0.

4-channel data D1, D2, D3, and D4 having the same bit rate enter time-division multiplexer 114 in an optical transmitter 110. A pilot signal generator 116 generates a pilot signal P and applies it to a multiplexer 114. The multiplexer 114 multiplexes the 4 data D1, D2, D3, and D4 and the pilot signal in the time domain to output a multiplexed signal having a bit rate B. FIG. 4(a) shows a bit train output from the multiplexer 114. The data D1 includes bits b0, b4, b8, b12 . . . , the data D2 includes bits b1, b5, b9, b13 . . . , the data D3 includes bits b2, b6, b10, b14 . . . , and the data D4 includes bits b3, b7, b11, b15 . . . .

In this embodiment, similar to the first embodiment, a pilot signal is 0 as a binary value. Therefore, it is applicable that the multiplexer 114 itself inserts a binary value 0 into the timeslot for a pilot signal in a multiplexed signal.

A laser diode 118 outputs a coherent pulse laser light having a repetition rate B (Hz). A BPSK modulator 120 modulates the optical phase of the laser light from the laser diode 118 according to the output bit train from the multiplexer 114. Specifically, the BPSK modulator 120 outputs an optical signal having an optical phase 0 when the output bit from the multiplexer 114 is 0 and outputs an optical signal having an optical phase $\pi$ when the output bit from the multiplexer 114 is 1.

The signal light output from the BPSK modulator 120 carries the input data D1, D2, D3, and D4 and the pilot signal P. The output optical signal from the BPSK modulator 120 is sent to an optical transmission line 130 as an output optical signal from the optical transmitter 110. The optical signal having propagated in the optical transmission line 130 enters an optical receiver 140.

In the optical receiver 140, the signal light from the optical transmission line 130 first enters an optical splitter 142. The optical splitter 142 split the signal light from the optical transmission line 130 to ten portions, each having an equal optical power.

A first split optical signal from the optical splitter 142 enters an optical coupler 144a for optical interference and a second split optical light enters the optical coupler 144a through a 1-bit optical delay 146a. The coupler 144a couples the optical signal from the optical transmission line 130 with the 1-bit delayed split optical signal. The optical intensity of the first split optical signal is equal to that of the second split optical signal. As is generally known, this optical circuit is a delay interferometer in which an optical delay is disposed on one of arms of a Mach-Zehnder interferometer and functions in this embodiment as a bit separator to optically separate a bit data in a specific timeslot.

FIG. 4(b) shows a bit disposition of an output optical signal from the optical delay 146a. The optical coupler 144a optically couples an optical signal having the bit disposition shown in FIG. 4(a) with an optical signal having the bit disposition shown in FIG. 4(b) to separate the bits b3, b4, b7, b8, b11, b12 . . . that are located in the timeslots in which pilot signals exist in the other input signal, using optical interference. FIG. 4(f) shows a bit disposition of an output optical signal from the optical coupler 144a. In the timeslots in which no pilot signal exists in both input optical signals, the output value of the optical coupler 144a depends on a bit value of the data D1 to D4 to be unknown or undefined and thus those timeslots are left in blank in FIG. 4(f). It is understandable from FIG. 4(f) that an optical signal from the optical coupler 144a carries the data D1 and D4.

In this embodiment, similar to the first embodiment, the optical phase of a pilot signal P in an optical state is 0 and the optical phase of each bit b0, . . . of the input data D1 to D4 is 0 or $\pi$. Although a coupling result of a bit signal having the optical phase 0 and a pilot signal P becomes a signal having non-zero optical intensity, a coupling result of a bit signal having an optical phase $\pi$ and a pilot signal P becomes a signal having zero optical intensity due to interference. In this embodiment, a signal output from the optical coupler 144a also becomes a negative logic. To solve such logical inversion, a logical inverter should be disposed at an appropriate spot in the rear stage. As is generally known, there is an optical coupler to generate an optical signal with non-zero intensity when the optical phases of input lights are 0 and $\pi$ and to generate a signal with zero intensity when the optical phases of both input lights are 0. This type of optical coupler is also applicable to solve the logical inversion.

A bit separator including an optical coupler 144b and a 2-bit optical delay 146b separates bits b2, b5, b6, b9, b10, b13, . . . from the third and fourth split optical signals from the optical splitter 142. The optical intensity of the third split optical signal is equal to that of the fourth split optical signal. FIG. 4(c) shows a bit disposition of an optical signal from the optical delay 146b. The optical coupler 144b optically couples an optical signal having the bit disposition shown in FIG. 4(a) with an optical signal having the bit disposition shown in FIG. 4(c) to separate the bits b2, b5, b6, b9, b10, b13, . . . using optical interference. FIG. 4(g) shows a bit disposition of an optical signal output from the optical coupler 144b. In the timeslots in which no pilot signal P exists in both input signals into the optical coupler 144b, an output value from the optical coupler 144b depends on a bit value of the data D1 to D4 to be unknown or undefined and thus those timeslots are left in blank in FIG. 4(g). It is understandable from FIG. 4(g) that an optical signal from the optical coupler 144b carries the data D2 and D3.

A bit separator including an optical coupler 144c and a 3-bit optical delay 146c separate bits b1, b5, b6, b9, b10, b13, . . . from the fifth and sixth split optical signals from the optical splitter 142. The optical intensity of the fifth split optical signal is equal to that of the sixth split optical signal. FIG. 4(d) shows the bit disposition of a signal output from the optical delay 146c. The optical coupler 144c optically couples an optical signal having the bit disposition shown in FIG. 4(a) with an optical signal having the bit disposition shown in FIG. 4(d) to separate the bits b1, b6, b5, b10, b9, b14 in this order using optical interference. FIG. 4(h) shows the bit disposition of an optical signal from the optical coupler 144c. In the timeslots in which no pilot signal P exists in both input signals into the optical coupler 144c, an output value from the optical coupler 144c depends on a bit value of the data D1 to D4 to be un known or undefined and thus those timeslots are left in blank in FIG. 4(h). It is understandable from FIG. 4(*h*) that an optical signal from the optical coupler 144*c* carries the data D2 and D3.

A bit separator including an optical coupler 144*d* and a 4-bit optical delay 146*d* separates bits b0, b4, b7, b8, b11, b12, . . . from the seventh and eighth split optical signals from the optical splitter 142. The optical intensity of the seventh split optical signal is equal to that of the eighth split optical signal. The FIG. 4(*e*) shows the bit disposition of an optical signal from the optical delay 146*d*. The optical coupler 144*d* optically couples an optical signal having the bit disposition shown in FIG. 4(*a*) with an optical signal having the bit disposition shown in FIG. 4(*e*) to separate the bits b0, b7, b4, b11, b8, b15, . . . in this order using optical interference. FIG. 4(*i*) shows the bit disposition of an optical signal from the optical coupler 144*d*. In the timeslots in which no pilot signal P exists in both input signals into the optical coupler 144*d*, an output value from the optical coupler 144*d* depends on a bit value of the data D1 to D4 to be unknown or undefined and thus those timeslots are left in blank in FIG. 4(*i*). It is understandable from FIG. 4(*i*) that an optical signal from the optical coupler 144*d* carries the data D1 and D4.

A pilot separator including an optical coupler 144*e* and a 5-bit optical delay 146*e* separates a pilot signal P from the ninth and tenth split optical signals from the optical splitter 142. The optical intensity of the ninth split optical signal is equal to that of the tenth split optical signal. The optical signal output from the 5-bit optical delay 146 is a signal in which the input signal light from the transmission line 130 is delayed by 1-frame and pilot signals of both input optical signals to the optical coupler 144*e* are located in the same timeslot. Therefore, an optical signal output from the optical coupler 144*e* includes a pilot signal P every 5 bits. In the timeslots in which no pilot signal P exists, an output value from the optical coupler 144*e* depends on a bit value of the data D1 to D4 and thus it is unknown or undefined.

A photodetector 148*a* converts the optical signal from the optical coupler 144*a* into an electrical signal. The output light from the photodetector 148*a* is applied to a gate 150*a*. Similar to this, photodetectors 148*b* to 148*e* convert the output optical signals from the optical couplers 144*b* to 144*e* into electrical signals respectively. The output signals from the photodetectors 148*b* to 148*d* are applied to gates 150*b* to 150*d* respectively.

The output signal from the photodetector 148*e* is applied to a control terminal of a local oscillator 154 through a bandpass filter 152 to extract a pilot signal component. The part including the optical coupler 144*e*, the optical delay 146*e*, the photodetector 148*e*, and the filter 152 functions to separate a pilot signal or a frequency component of the pilot signal from a signal light input from the optical transmission line 130. The frame start timing is known according to an output from the filter 152.

A local oscillator 154 oscillates at the oscillation frequency corresponding to the bit rate B of an output signal from the multiplexer 114 and applies a clock having the oscillation frequency to a gate 156. The phase of the output clock from the local oscillator 154 is controlled to synchronize with an output from the filter 152. Accordingly, the output clock from the local oscillator 154 also is a frame-timing signal to provide the frame timing.

It is also applicable that the local oscillator 154 includes a circuit which regenerates a clock from an input light from the optical transmission line 130 and controls the phase of the clock using an output from the filter 152.

A gate controller 156 controls the transmission through the gates 150*a* to 150*d* respectively according to the clock from the local oscillator 154. The bit number in one frame and the location of a pilot signal in one frame are already known. Accordingly, the gate controller 156 can correctly determine a data bit part and a pilot signal part in an input signal from the transmission line 130 according to the information of the frame configuration as well as a clock from the local oscillator 154 synchronized with a pilot signal. Based on the determination, the gate controller 156 controls the gate 150*a* to transmit the bits b4, b8, b12, . . . of the data D1 in an output signal from the photodetector 148*a* (see FIG. 4(*f*)), controls the gate 150*b* to transmit the bits b5, b9, b13, . . . of the data D2 in an output signal from the photodetector 148*b* (see FIG. 4(*g*)), controls the gate 150*c* to transmit the bits b6, b10, b14, . . . of the data D3 in an output signal from the photodetector 148*c* (see FIG. 4(*h*)), and controls the gate 150*d* to transmit the bits b7, b11, b15, . . . of the data D4 in an output signal from the photodetector 148*d* (see FIG. 4(*i*)). With the above control operations, the bits of each data D1 to D4 are extracted.

Binary discriminators 158*a* to 158*d* binary-discriminate output signals from the corresponding gates 150*a* to 150*d* using predetermined thresholds respectively and apply the discriminated results to buffer memories 160*a* to 160*d* respectively. The buffer memories 160*a* to 160*d* store the output data from the corresponding binary discriminators 158*a* to 158*d* according to a writing control signal output from the gate controller 156 respectively. The stored data of the buffer memories 160*a* to 160*d* are read out at a constant rate and output to the outside respectively. The data D1 to D4 are read out from the buffer memories 160*a* to 160*d* respectively.

In this embodiment, it is controlled not to write redundant data in the buffer memories 160*a* to 160*d* through the writing control. However, it is also applicable to write all the output bit values from the binary discriminators 156*a* to 156*d* in the buffer memories 160*a* to 160*d* and not to read out unnecessary data.

With the above procedures, the optical receiver 140 receives the data D1 to D4 transmitted from the optical transmitter 110 and outputs the received data to the units in the rear.

As understandable from FIGS. 4(*f*) to 4(*i*), the gate 150*a* to 150*d* do not transmit input signals simultaneously. Accordingly, it is also applicable to dispose switch which circularly selects one of the outputs from the photodetectors 148*a* to 148*d* instead of utilizing the gates 150*a* to 150*d*. In this case, however, as obvious from FIG. 4(*f*), it is necessary to select an output from the photodetector 148*a* twice in a row. The first selected output is overlapped with an output from the photodetector 148*d* and thus it is discarded. In this configuration, although only a single binary discriminator and a single buffer memory are sufficient, it is necessary to dispose a separator to separate the data D1 to D4 into respective data.

In addition, as is clear from FIG. 4(*f*) to 4(*i*), when the transmission timing of the gate 150*a* to 150*d* is controlled, it is possible to take the data D1 and D4 from an output from the binary discriminator 158*a*, the data D2 and D3 from an output from the binary discriminator 158*b*, the data D2 and D3 from an output from the binary discriminator 158*c*, and the data D1 and D4 from an output from the binary discriminator 158*d*. In this case, it is necessary to change the bit locations. When this configuration is employed, the four systems of bit separators in FIG. 3 can be reduced to two systems.

The photodetectors 148*a* to 148*e* can include either a configuration having a signal photodetecting element or a balanced receiver configuration having two photodetecting elements. The latter configuration is more resistant to noise. When the balanced receiver configuration is utilized, the optical couplers 144*a* to 144*e* should be changed to the type having an output port to couple two input lights in the same phase and an output port to couple two input lights in the opposite phase.

When it is sufficient to receive a data, e.g. D1, from a specific channel alone like a user in an access system, a single receiving system to excessively receive the data D1 should be provided. When it is desired to change the receiving channels on occasion, the optical delay time of the optical delays 146a to 146d should be set variable.

This embodiment is also applicable to amplitude modulation. In this case, the maximum amplitude value is given to a pilot signal so that a signal located in the same timeslot with the pilot signal is separated by a delay separator.

In the above embodiment, although the phase of a pilot signal to be inserted in a modulated signal is fixed, generally it is sufficient if any one of the physical values such as amplitude and phase is fixed. Each modulated signal can be separated using the fixed physical value.

In general, the delay detection needs preprocessing procedure, namely preceding, according to the delay time in a transmitter. In this embodiment, however, such precoding is unnecessary and accordingly the configuration of the transmitter is simplified.

A pilot signal, which is regularly inserted, is used to detect the data of a desired timeslot and therefore a PLL circuit (or an optical PLL circuit in an optical transmission system), which is required in the conventional synchronous detection, can be omitted. Since an optical PLL is quite expensive, it is possible to realize a receiver at a very low price. In addition, the pilot signal propagates in the same transmission line with the data and thus it is possible to obtain the data transmission performance that is high tolerance to the fluctuations in a transmission line. The polarization deviation due to the optical heterodyne detection does not occur.

Although the pilot signal and the data are multiplexed first and converted into an optical signal, it is applicable that the pilot signal and the data are converted into optical signals respectively and then time-division-multiplexed; namely what is called OTDM (Optical Time Division Multiplexing) can be used.

Figure 5:
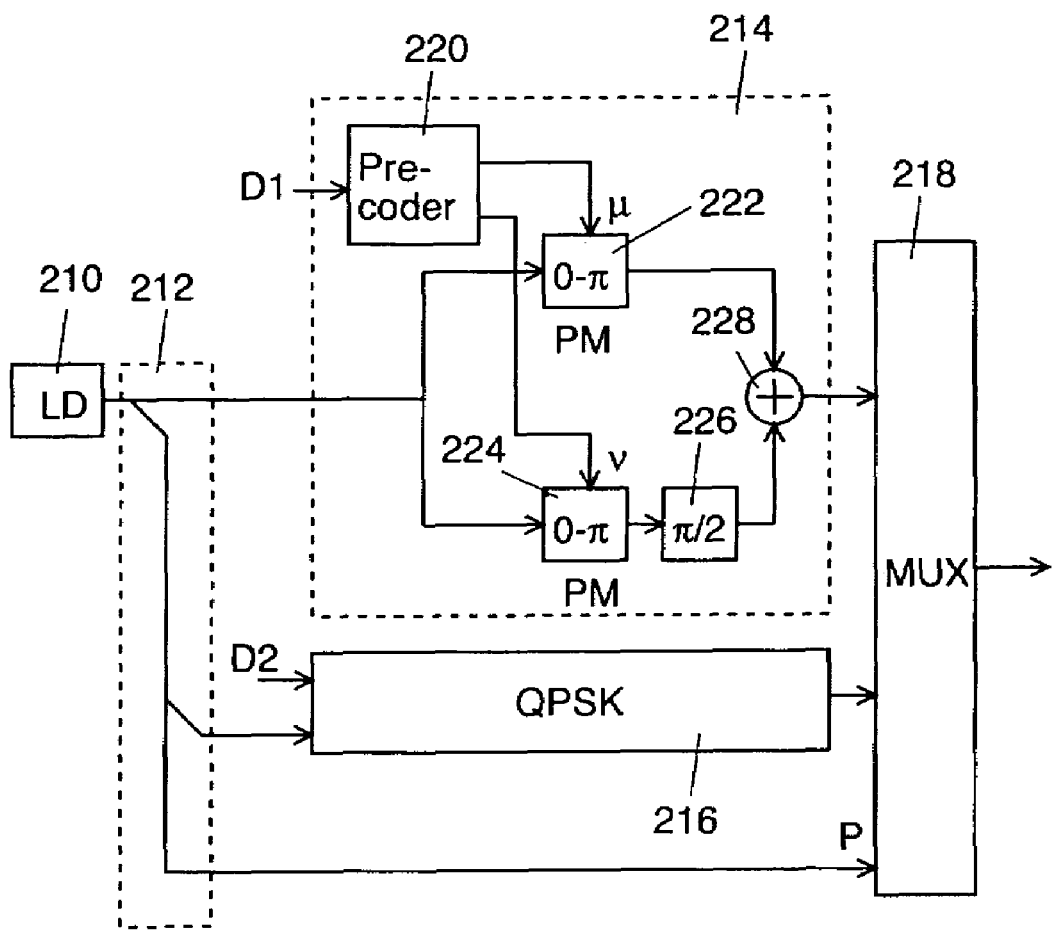
FIG. 5 shows a schematic block diagram of a transmitter in an exemplary embodiment adapted to QPSK modulation.
Figure 6:
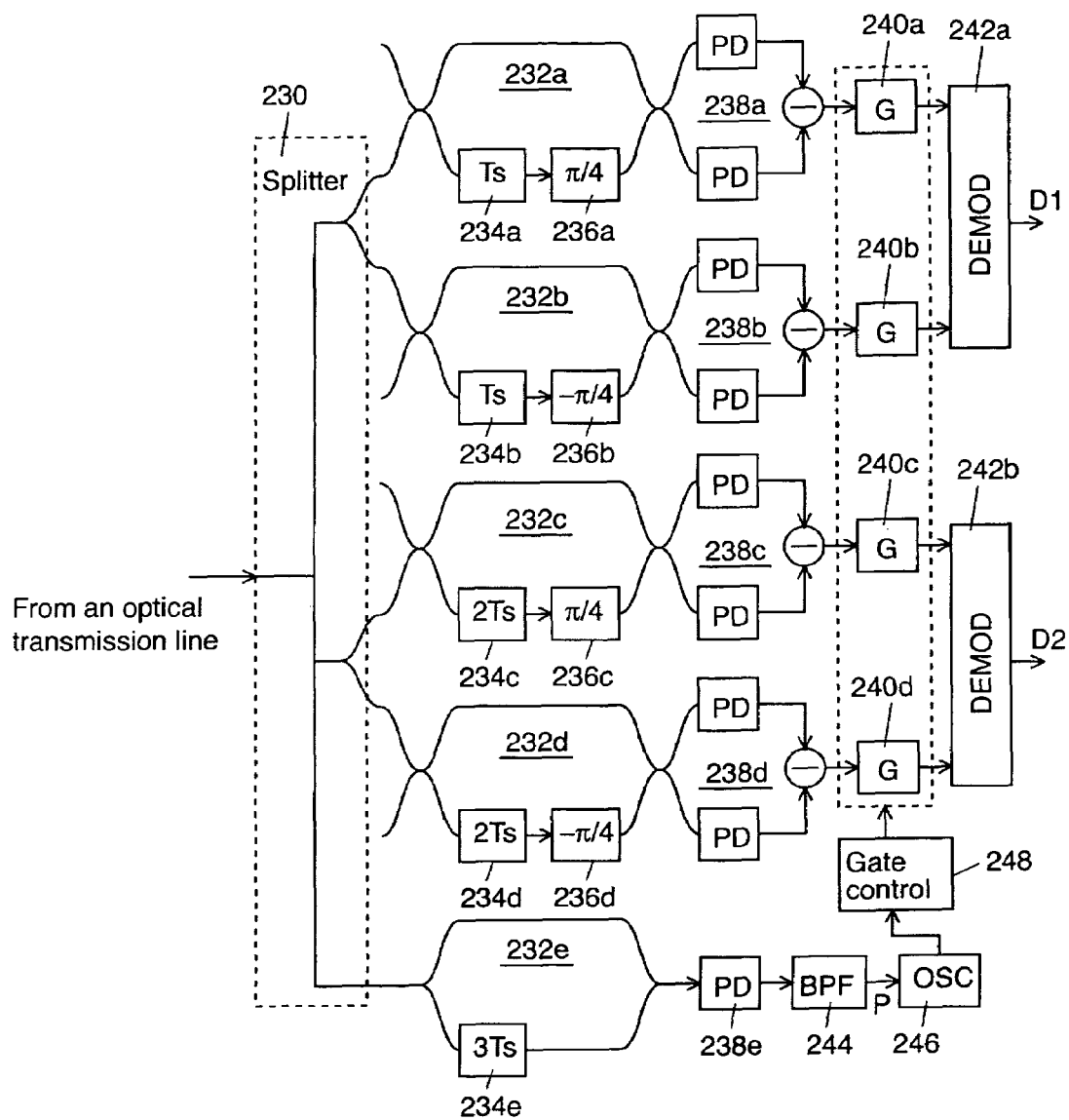
FIG. 6 shows a schematic block diagram of a receiver corresponding to the embodiment shown in FIG. 5.

An exemplary embodiment applied to QPSK modulation is explained next. FIG. 5 shows a schematic block diagram of a transmitter employed in this embodiment and FIG. 6 shows a schematic block diagram of a receiver employed in this embodiment.

The configuration and operation of the transmitter shown in FIG. 5 is explained below. A laser diode 210 generates a pulse laser light having a repetition rate B (Hz). An optical splitter 212 splits the output laser light from the laser diode 210 into three portions and applies a first split portion to a QPSK modulator 214, a second split portion to a QPSK modulator 216, and a third split portion to an optical multiplexer 218 as a pilot signal P.

The QPSK modulator 214 includes a well-known configuration. A precoder 220 encodes data D1 for QPSK modulation to generate a signal $\mu$ and a signal $\nu$. A 0-$\pi$ phase modulator 222 phase-modulates the laser pulse light from the optical splitter 212 according to the signal $\mu$. A 0-$\pi$ phase modulator 224 phase-modulates the laser pulse light from the optical splitter 212 according to the signal $\nu$. A phase shifter 226 shifts the phase of the output light from the phase modulator 224 by $\pi/2$. An adder 228 adds the output signal light from the phase modulator 222 with the output signal light from the phase shifter 226. The signal light output from the adder 228, namely a QPSK signal light carrying the data D1, enters the multiplexer 218.

The QPSK modulator 216 having a configuration similar to the QPSK modulator 214 applies a QPSK signal light carrying data D2 to the multiplexer 218.

The multiplexer 218 time-division-multiplexes the output optical signals from the QPSK modulators 214 and 216 together with the pulse laser light from the optical splitter 212. The pulse laser light from the optical splitter 212 becomes a pilot signal. The optical phase of the pilot signal light is set to 0. In this embodiment, one frame includes 3 timeslots and a pilot signal is inserted in the first timeslot, a signal light carrying the data D1 is inserted in the second timeslot, and a signal light carrying the data D2 is inserted in the third timeslot.

The output light from the multiplexer 218 enters a receiver shown in FIG. 6 through an optical transmission line, which is not shown in the figure.

The signal light from the optical transmission line enters an optical splitter 230. The optical splitter 230 splits the input signal light into three portions and distributes them to a receiving system of the data D1, a receiving system of the data D2, and a separating system for a pilot signal respectively.

In the QPSK system, laser lights are phase-modulated on either axis of phase 0 or phase $\pi/2$ separately and then both modulated waves are combined. Accordingly, when the phase of a modulated wave is shifted by $\pi/4$ or $-\pi/4$ on the receiving side, each component of the modulated wave becomes equal to that of a modulated wave in a BPSK system.

The receiving system for the signal $\mu$ of the data D1 includes a Mach-Zehnder interferometer 232a and a balanced photodetector 238a. The signal light split by the optical splitter 230 enters the Mach-Zehnder interferometer 232a. An optical delay 234a of delay time Ts and a $\pi/4$ phase shifter 236a are disposed on one of the arms of the Mach-Zehnder interferometer 232a. The balanced photodetector 238a balanced-receives the two interfered optical signals output from the Mach-Zehnder interferometer 232a. A gate 240a extracts or gates a signal in the timeslot carrying the data D1 from the electrical signal output from the balanced photodetector 238a under the control of a gate control unit 248.

The receiving system for the signal $\nu$ of the data D1 includes a Mach-Zehnder interferometer 232b and a balanced photodetector 238b. The signal light split by the optical splitter 230 enters the Mach-Zehnder interferometer 232b. An optical delay 234b of delay time Ts and a $-\pi/4$ phase shifter 236b are disposed on one of the arms of the Mach-Zehnder interferometer 232b. The balanced photodetector 238b also balanced-receives the two interfered optical signals output from the Mach-Zehnder interferometer 232b. Similar to the operation of the gate 240a, a gate 240b extracts or gates a signal in the timeslot carrying the data D1 from the electrical signal output from the balanced photodetector 238b under the control of the gate control unit 248.

The receiving systems for the data D2 are similar to those for the data D1 except for the delay time of an optical delay that is set to 2Ts. The receiving system for a signal $\mu$ of the data D2 includes a Mach-Zehnder interferometer 232c and a balanced photodetector 238c. The signal split by the optical splitter 230 enters the Mach-Zehnder interferometer 232c. An optical delay 234c of delay time 2Ts and a $\pi/4$ phase shifter 236c are disposed on one of the arms of the Mach-Zehnder interferometer 232c. The balanced photodetector 238c balanced-receives the two interfered optical signals output from the Mach-Zehnder interferometer 232c. A gate 240c extracts or gates a signal in the time slot carrying the data D2 from the electrical signal output from the balanced photodetector 238c under the control of the gate control unit 248.

The receiving system for a signal v of the data D2 includes a Mach-Zehnder interferometer 232d and a balanced photodetector 238d. The signal split by the optical splitter 230 enters the Mach-Zehnder interferometer 232d. An optical delay 234d of delay time 2Ts and a −π/4 phase shifter 236d are disposed on one of the arms of the Mach-Zehnder interferometer 232d. The balanced photodetector 238d balanced-receives the two interfered optical signals output from the Mach-Zehnder interferometer 232d. A gate 240 dextracts or gates a signal in the timeslot carrying the data D2 from the electrical signal output from the balanced photodetector 238d under the control of the gate control unit 248.

The configuration and operation of a separating system for a pilot signal is explained next. One of the split optical signals from the optical splitter 230 enters a Mach-Zehnder interferometer 232e. An optical delay 234e of delay time 3Ts is disposed on one of the arms of the Mach-Zehnder interferometer 232e. A photodetector 238e converts the single interfered optical signal output from the Mach-Zehnder interferometer 232e into an electrical signal. It is applicable to connect a π/4 or −π/4 phase shifter with the optical delayer 234e in serial similar to the configurations of the receiving systems for the data D1 and D2. It is also applicable to use a balanced photodetector.

A bandpass filter 244 extracts a pilot signal component from the signal output from the photodetector 238e and applies the extracted component to a local oscillator 246. The local oscillator 246 oscillates at a frequency that is synchronized with and equivalent to the frequency of the output from the bandpass filter 244. The part including the Mach-Zehnder interferometer 232e, the optical delay 234e, the photodetector 238e, and the bandpass filter 244 functions as an apparatus to separate the pilot signal or its frequency component from the optical signal input from the optical transmission line. The frame start timing is known from the output from the filter 244.

The local oscillator 246 oscillates at an oscillation frequency corresponding to the bit rate of a frame from the transmitter and applies a clock of the oscillation frequency to the gate control unit 248. It is also applicable that the local oscillator 246 has a configuration to regenerate a clock from an optical signal input from the optical transmission line to control the phase of the clock with the output from the filter 244.

The gate control unit 248 controls the gates 240a to 240d according to the clock from the local oscillator 246. The bit number in one frame and the location of a pilot signal are already given. The gate control unit 248 can accurately determine the data bit part and the pilot signal part in the input signal light from the transmission line according to the frame configuration information and the clock, which is synchronized with the pilot signal, from the local oscillator 246. The gate control unit 248, based on this determination, controls the gates 240a to 240d to transmit the signals in the above-described timeslots respectively according to the clock from the local oscillator 246.

A QPSK demodulator 242a demodulates the data D1 from the output signals from the gates 240a and 240b. A QPSK demodulator 242b demodulates the data D2 from the output signals from the gates 240c and 240d.

As is described above, when the QPSK modulation is employed, the data can be transmitted using a simple configuration. Even in the multilevel PSK modulation in which the level number is more than four, the data can be transmitted using basically the same configuration. However, the configuration of the modulators 242a, 242b is subject to change according to the level number.

Although the embodiment for the pulse modulation (or amplitude modulation) and the embodiment for the phase modulation are separately explained above, the subject invention is applicable to a modulating system such as a QAM system in which the phase modulation and the amplitude modulation are combined. In a 16 QAM system, a phase modulation using 0 and π and an amplitude modulation having four amplitude levels −3, −1, 1, and 3 are used together to make a combined system. Two of such combined systems should be provided. A 4-bit data is converted into 16 patterns of modulated waves. For instance, although the phase of a pilot signal is set to 0 and the amplitude level of the pilot signal is set to the maximum level 3, those values can be properly selected based on the conditions of a transmission line. In the receiving side, a 4-level discriminator should be disposed before or after the gates 240a to 240d in the configuration shown in FIG. 6.

When the amplitude of the pilot signal is set to be larger than that of the other signal in the transmitter, determination of the frame timing becomes easier in the receiver.

Figure 7:
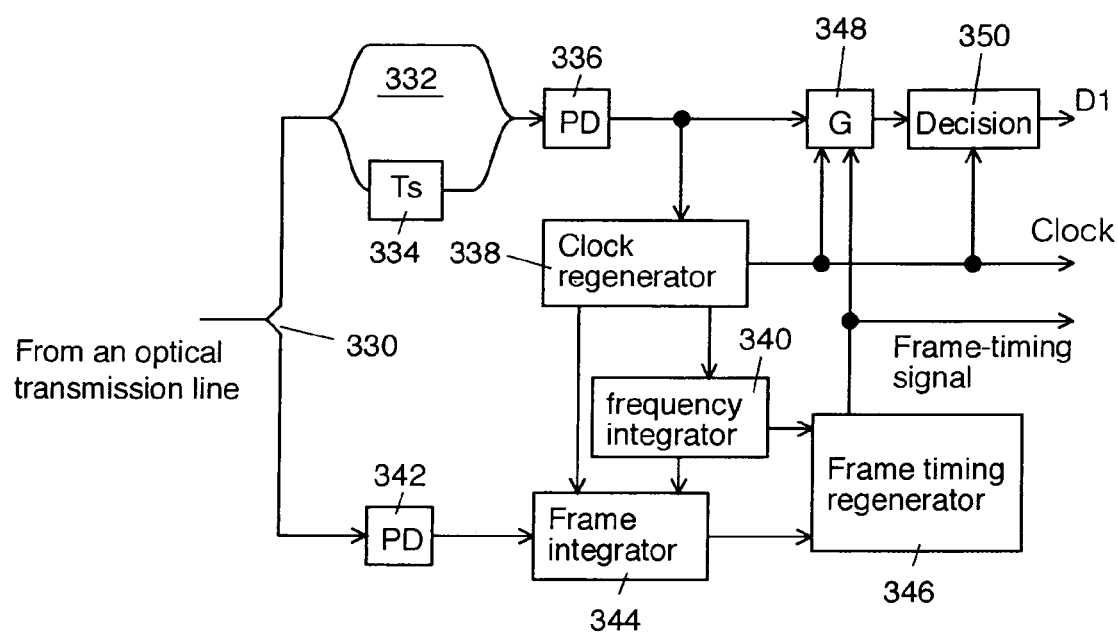
FIG. 7 shows a schematic block diagram of another configuration of an optical receiver.

FIG. 7 shows a schematic block diagram of a receiving system for one of the data, D1 for example, corresponding to the above-mentioned modification. The modulation method is BPSK.

An optical splitter 330 splits a signal light from the optical transmission line into two portions and applies one portion to a Mach-Zehnder interferometer 332 and the other to a photodetector 342. One frame includes 3 bits or more similar to the embodiments shown in FIGS. 1 and 2. As already explained above, the amplitude of the pilot signal to be multiplexed with the modulated signal light is set to a constant value being larger than that of the modulated signal light.

An optical delay 334 of delay time Ts is disposed on one of the arms of the Mach-Zehnder interferometer 332. The photodetector 336 converts the output light from the Mach-Zehnder interferometer 332, which output light is obtained through the interference between the signal light from the optical transmission line and a signal light delayed by 1-bit from the original signal, into an electrical signal.

A clock regenerator 338 regenerates a clock from the output electrical signal from the photodetector 336. The frequency of this clock corresponds to the bit rate of the signal input from the optical transmission line. A frequency divider 340 frequency-divides the clock output from the clock regenerator 338 to output a clock of frame frequency.

A photodetector 342 converts the optical signal from the optical splitter 330 into an electrical signal. A frame integrator 344 integrates the output from the photodetector 342 according to the output clock from the clock regenerator 338. The frame integrator 344 outputs the integrated value to a frame timing regenerator 346 according to the output from the frequency integrator 340 and clears the value. The output from the frame integrator 344 indicates the timing of a pilot signal.

The frame timing regenerator 346 regenerates the frame-timing signal to indicate the frame timing according to the outputs from the frame integrator 344 and the frequency divider 340. The frame timing signal output from the frame timing regenerator 346 is sent to the outside and is applied to a gate 348 as a gate control signal.

The gate 348 exclusively transmits a signal in the timeslot corresponding to the data D1 out of the output from the photodetector 336 according to the regenerated clock from the clock regenerator 338 as well as the frame timing signal from the frame timing regenerator 346.

A decision apparatus 350 decides a digital value of the output signal from the gate 348 according to the regenerated clock from the clock regenerator 338 using a judging method corresponding to the modulation method. The decision apparatus 350 is also a demodulator suitable for the data modulation method. The decided result by the decision apparatus 350 is output to the outside as a received data D1.

Although the modulation system used in the embodiments is explained as BPSK, the other modulation systems are also applicable. When another modulation system is used, the inside of the decision apparatus 350 should be changed according to each modulation system.

In the above-mentioned embodiments, although constitution unit of the frame is set to 1 bit to make it easily understandable, it is applicable to set a predetermined number of bits as the unit. That is, one frame includes a plurality of symbols, one symbol being a unit to have one or a plurality of bits. A pilot signal is assigned to one of the symbols in the frame.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A data transmission method comprising:
   generating a transmission optical signal having a frame, the frame including n symbols and containing a pilot signal with fixed amplitude and phase in one of the symbols and a data signal in two or more of the symbols, where n is an integer of 3 or more;
   outputting the transmission optical signal to a transmission line;
   generating a frame-timing signal from the transmission optical signal received from the transmission line; and
   separating the data signal from the transmission optical signal received from the transmission line according to the frame-timing signal,
   wherein the separating step comprises:
   splitting the transmission optical signal into a plurality of split optical signals;
   delaying one of the plurality of split optical signals with a first delay time corresponding to an integral multiple of a single symbol period;
   coupling a second one of the plurality of split optical signals with the delayed split optical signal to generate a first coupled split signal;
   photoelectrically converting the fist coupled split optical signal into an electrical signal; and
   extracting the data signal in a symbol corresponding to the delay time from the electrical signal according to the frame-timing signal.

2. The data transmission method of claim 1 wherein the separating step further comprises:
   delaying a third one of the plurality of split optical signals with a second delay time different from the first delay time and corresponds to an integral multiple of the single symbol period;
   coupling a fourth one of the plurality of split optical signals with the delayed third split to generate a second coupled optical signal;
   photoelectrically converting the second coupled optical signal into a second electrical signal; and
   extracting a second data signal in a symbol corresponding to the second delay time from the second electrical signal according to the frame-timing signal.

3. The data transmission method of claim 1 wherein the separating step for each symbol containing the data signal further comprises:
   delaying one of the plurality of split optical signals with a respective delay time corresponding to the symbol;
   coupling another one of the plurality of split optical signals with the delayed split optical signal to generate a respective coupled signal;
   photoelectrically converting the respective couple optical signal into an electrical signal; and
   extracting a respective data signal in a respective symbol from the electrical signal according to the frame-timing signal.

4. The data transmission method of claim 1 wherein the generating step comprises:
   time-division-multiplexing the pilot signal and the data signal; and
   converting the time-division-multiplexed data signal and the pilot signal into the transmission optical signal.

5. The data transmission method of claim 4 wherein the converting step comprises phase-modulating a phase of a laser light with the multiplexed data signal and the pilot signal.

6. The data transmission method of claim 4 wherein the converting step comprises amplitude-modulating an amplitude of a laser light with the multiplexed data signal and the pilot signal.

7. The data transmission method of claim 1 wherein the generating a transmission optical signal step comprises:
   converting the data signal into a data optical signal;
   converting the pilot signal into a pilot optical signal; and
   time-division-multiplexing the data optical signal and the pilot optical signal.

8. A data transmission system comprising:
   an optical transmitter to generate a transmission optical signal having a frame, the frame including n symbols and containing a pilot signal with fixed amplitude and phase in one of the symbols and a data signal in two or more of the symbols, and to output the transmission optical signal into a transmission line, where n is an integer of 3 or more;
   an optical splitter to split the transmission optical signal received from the transmission line into a plurality of split optical signals;
   a timing signal generator to generate a frame-timing signal from one of the plurality of split optical signals; and
   a data separator to separate the data signal from the transmission optical signal received from the transmission line according to the frame-timing signal,
   wherein the data separator comprises:
   a delay interferometer to which a first one of the plurality of split optical signals enters, the delay interferometer having a first optical delay to generate a delayed optical signal corresponding to an integral multiple of a single symbol period; and
   a data signal extractor to extract a first data signal in a symbol corresponding to the delayed optical signal according to the frame-timing signal.

9. The data transmission system of claim 8 wherein the data signal extractor comprises:
   a photoelectrical converter to convert the delayed optical signal into an electrical signal with a delayed line; and
   a gate to transmit a data signal in the symbol corresponding to the delay time of the electrical signal according to the frame-timing signal.

10. The data transmission system of claim 8 wherein the separator further comprises:
   a second delay interferometer to which a second one of the plurality of split optical signals enters, the second delay interferometer having a second optical delay different than the first delayed optical signal and corresponding to an integral multiple of the single symbol period; and
   a second data signal extractor to extract a second data signal in a symbol corresponding to the second optical delay according to the frame-timing signal.

11. The data transmission system of claim 8 wherein the separator further comprises:
   a plurality of delay interferometers to which one of the plurality of split optical signals enters, each delay interferometer having an optical delay time which corresponds to an integral multiple of the single symbol period, the delay times of respective delay interferometers being different from each other; and
   a plurality of data signal extractors, each extracting a respective data signal in a respective symbol from the delayed optical signal according to the frame-timing signal.

12. The data transmission system of claim 8 wherein the optical transmitter comprises:
   a multiplexer to time-division-multiplex the pilot signal and the data signal; and
   a converter to convert the multiplexed data signal and pilot signal output from the multiplexer into the transmission optical signal.

13. The data transmission system of claim 12 wherein the converter comprises:
   a laser light source; and
   a phase modulator to modulate a phase of a laser light output from the laser light source with the multiplexed data signal and pilot signal output from the multiplexer.

14. The data transmission system of claim 12 wherein the converter comprises:
   a laser light source; and
   an optical modulator to modulate an amplitude of a laser light output from the laser light source with the multiplexed data signal and the pilot signal output from the multiplexer.

15. The data transmission system of claim 12 wherein the optical transmitter comprises:
   a data converter to convert the data signal into a data optical signal; and
   an optical multiplexer to time-division-multiplex the data optical signal and a pilot optical signal.

16. A data reception method for receiving data through a transmission optical signal having a frame, the frame including n symbols and containing a pilot signal with fixed amplitude and phase in one of the symbols and a data signal in two or more of the symbols, where n is an integer of 3 or more, the method comprising:
   generating a frame-timing signal from the transmission optical signal; and
   separating the data signal from the transmission optical signal according to the frame-timing signal,
   wherein the separating step comprises:
   splitting the transmission optical signal into a plurality of split optical signals;
   delaying a first one of the plurality of split optical signals using an optical delay of a first delay time corresponding to an integral multiple of a single symbol period;
   coupling a second one of the plurality of split optical signals with the delayed split optical signal to generate a coupled optical signal;
   photoelectrically converting the coupled optical signal from into an electrical signal; and
   extracting a data signal in a symbol corresponding to the delay time from the electrical signal according to the frame-timing signal.

17. The data reception method of claim 16 wherein the separating step further comprises:
   delaying a third one of the plurality of split optical signals using a second optical delay of a second delay time different from the first delay time and corresponds to an integral multiple of the single symbol period;
   coupling a fourth one of the plurality of split optical signals with the delayed third split optical signal to generate a second coupled optical signal;
   photoelectrically convening the second coupled optical signal into a second electrical signal; and
   extracting a data signal in a symbol corresponding to the second delay time from the second electrical signal according to the frame-timing signal.

18. The data reception method of claim 16 wherein the separating step for each symbol containing the data signal further comprises:
   delaying one of the plurality of split optical signals with a respective delay time corresponding to the symbol;
   coupling another one of the plurality of split optical signals with the delayed split optical signal to generate a respective coupled signal;
   photoelectrically convening the respective coupled optical signal into an electrical signal; and
   extracting a respective data signal in a respective symbol from the electrical signal according to the frame-timing signal.

19. The data reception method of claim 16 wherein the transmission optical signal comprises a laser light phase-modulated with the data signal and the pilot signal.

20. An optical receiver to receive a data through a transmission optical signal which has a frame as a unit, the frame including n symbols and containing a pilot signal with fixed amplitude and phase in one of the symbols and a data signal in two or more of the symbols, where n is an integer of 3 or more, comprising:
   an optical splitter to split the transmission optical signal received from the transmission line into a plurality of split optical signals;
   a timing signal generator to generate a frame-timing signal from one of the plurality of split optical signals; and
   a data separator to separate the data signal from the transmission optical signal received from the transmission line according to the frame-timing signal,
   wherein the data separator comprises:
   a delay interferometer to which a first one of the plurality of split optical signals enters, the delay interferometer having a first optical delay to generate a delayed optical signal corresponding to an integral multiple of a single symbol period; and
   a data signal extractor to extract a first data signal in a symbol corresponding to the delayed optical signal according to the frame-timing signal.

21. The optical receiver of claim 20 wherein the data signal extractor comprises:
   a photoelectrical converter to convert the delayed optical signal into an electrical signal with a delayed line; and
   a gate to transmit a data signal in the symbol corresponding to the delay time of the electrical signal according to the frame-timing signal.

22. The optical receiver of claim 20 wherein the separator further comprises:
   a second delay interferometer to which a second one of the plurality of split optical signals enters, the second delay interferometer having a second optical delay different than the first delayed optical signal and corresponding to an integral multiple of the single symbol period; and
   a second data signal extractor to extract a second data signal in a symbol corresponding to the second optical delay according to the frame-timing signal.

23. The optical receiver of claim 20 wherein the separator comprises:

a plurality of delay interferometers to which one of the plurality of split optical signals enters, each delay interferometer having an optical delay time which corresponds to an integral multiple of the single symbol period, the delay times of respective delay interferometers being different from each other; and a plurality of data signal extractors, each extracting a respective data signal in a respective symbol from the delayed optical signal according to the frame-timing signal.

24. The optical receiver of claim 20 wherein the transmission optical signal comprises a laser light phase-modulated with the data signal and the pilot signal.

\* \* \* \* \*

UNITED STATES PATENT AND TRADEMARK OFFICE
CERTIFICATE OF CORRECTION

PATENT NO. : 7,609,974 B2 Page 1 of 1
APPLICATION NO. : 11/481756
DATED : October 27, 2009
INVENTOR(S) : Yukiyoshi Kamio et al.

It is certified that error appears in the above-identified patent and that said Letters Patent is hereby corrected as shown below:

| | |
|---|---|
| Column 15, line 41, Claim 1 | Delete "fist", Insert --first-- |
| Column 16, line 1, Claim 3 | Delete "couple", Insert --coupled-- |
| Column 18, line 6, Claim 17 | Delete "convening", Insert --converting-- |
| Column 18, line 20, Claim 18 | Delete "convening", Insert --converting-- |

Signed and Sealed this

Twenty-third Day of March, 2010

David J. Kappos
*Director of the United States Patent and Trademark Office*